Figure 1:
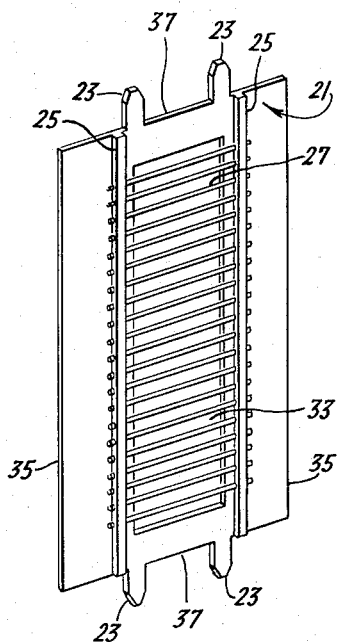

May 10, 1960   F. H. GRIMONE ET AL   2,936,392
FRAME GRID

Filed March 26, 1958   5 Sheets-Sheet 1

INVENTORS
JAMES M. CALEHUFF
FRANK H. GRIMONE
BY
Norman J. O'Malley
ATTORNEY

May 10, 1960 F. H. GRIMONE ET AL 2,936,392
FRAME GRID

Filed March 26, 1958 5 Sheets-Sheet 2

INVENTORS
JAMES M. CALEHUFF
FRANK H. GRIMONE
BY
Norman J. O'Malley
ATTORNEY

May 10, 1960   F. H. GRIMONE ET AL   2,936,392
FRAME GRID
Filed March 26, 1958   5 Sheets-Sheet 3

INVENTORS
JAMES M. CALEHUFF
FRANK H. GRIMONE
BY
Norman J. O'Malley
ATTORNEY

United States Patent Office 2,936,392
Patented May 10, 1960

2,936,392

FRAME GRID

Frank H. Grimone, Emporium, and James M. Calehuff, Montoursville, Pa., assignors, by mesne assignments, to Sylvania Electric Products Inc., Wilmington, Del., a corporation of Delaware Application March 26, 1958, Serial No. 724,184

3 Claims. (Cl. 313—348)

This invention relates generally to electron discharge devices and more specifically to the internal arrangement of electrodes in an electron discharge device and the electrode structures.

The vast majority of machine fabricated electron tubes use grid electrodes of the side rod supported type, wherein lateral grid wires are helically wound around two or more copper side rods and attached thereto in peened over notches. The side rod supported type electrode has met with exceptional success in helping to meet demands placed on tubes in circuit use; however, many tube types have been pushed to what appears to be a maximum due to heat dissipation limitations in the grid structures.

A few tube types have been fabricated using a planar type grid electrode having a lateral grid wire supporting frame with potentially greater heat dissipation characteristics than the majority of side rod supported electrode types. The cost of most prior art frame grids, however, has been either excessive or made competitive by sacrifice of certain desirable characteristics. Also most prior art planar type grid electrode forms require a radical departure from known assembly techniques. For example, several prior art concepts teach the use of a curved and rather flexible frame wherein lateral grid wires may be attached under relatively low tension and brought up to usable tension by flattening the frame in final assembly. Use of such a structure aggravates assembly problems. The prior art also suggests the use of a completely flat frame which might be readily assembled in a complete tube; however, there is no suggested provision for avoiding distortion in either relatively high temperature assembly processing steps or in subsequent high temperature use. A grid structure which alleviates many of the problems of the prior art is shown in co-pending patent application, Curry et al., Serial Number 674,659, filed July 29, 1957, and assigned to the same assignee as the present application.

Thus it is an object of this invention to improve usable heat dissipation characteristics of frame type grid electrodes.

It is a further object of this invention to maintain tension and parallel configuration of lateral grid wires under various operating temperatures and conditions in a frame type grid electrode.

It is a still further object of this invention to shape a frame type lateral grid wire supporting structure so as to obtain exceptionally stable characteristics in an electron discharge device having an anode and cathode along with one or more grid electrodes.

Briefly, the invention in one aspect comprises a grid electrode having a frame formed to provide a central aperture having two side legs and two end legs wherein the side legs include a raised bead for holding the terminal ends of the lateral grid wires above the side leg portion adjacent the bead and wherein the side legs also include external strengthening channels drawn in part from the portion of the frame internal the beads. The end legs are weakened or stretched and the side legs bent or rotated to increase lateral grid wire tension and bring the side leg aperture edges into contact with the lateral grid wires.

For a better understanding of the present invention, together with other and further objects, advantages and capabilities thereof, reference is made to the following disclosure and appended claims in connection with the accompanying drawings in which:

Fig. 1 shows a frame blank with attached lateral grid wires; and

Figure 2:
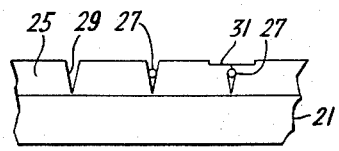
Figure 3:
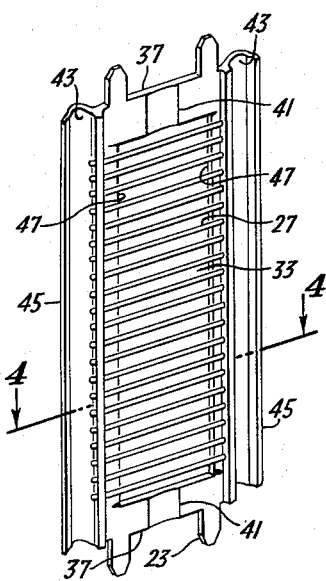
Figure 4:
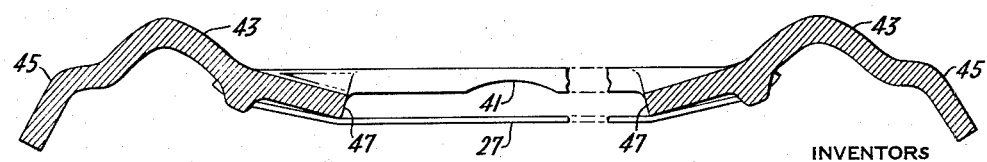
Figure 5:
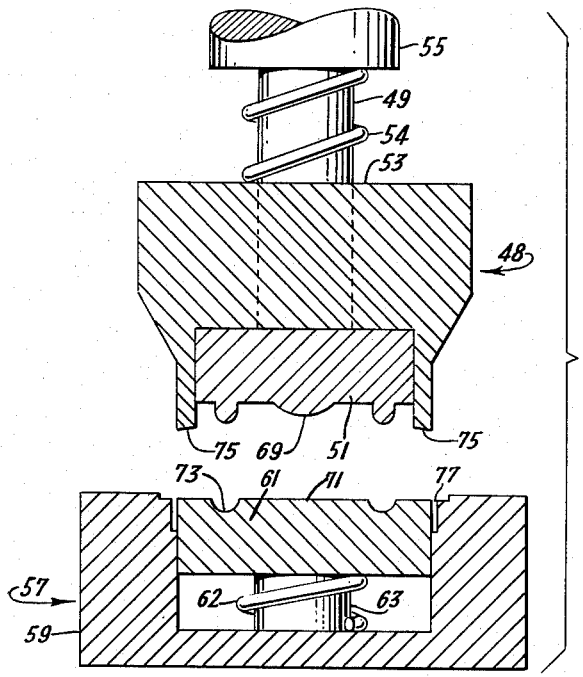
Figure 6:
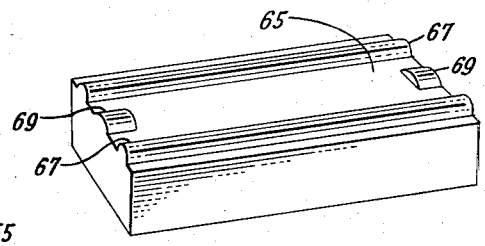
Figure 7:
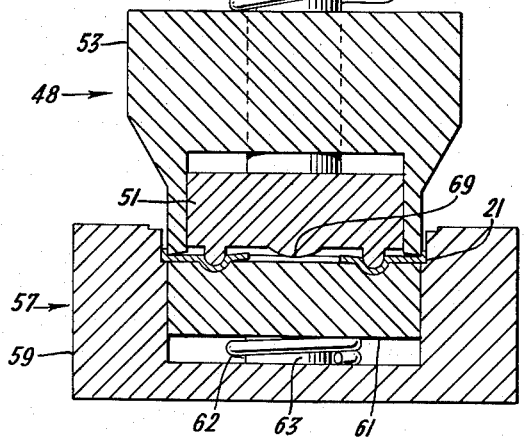
Figure 8:
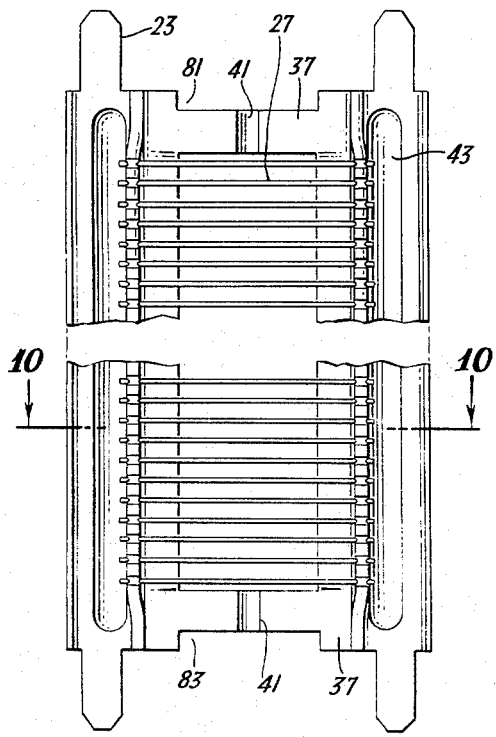
Figure 11:
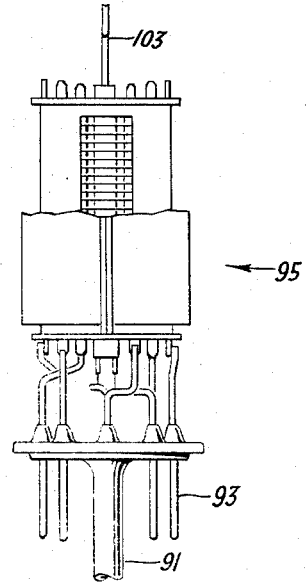
Figure 9:
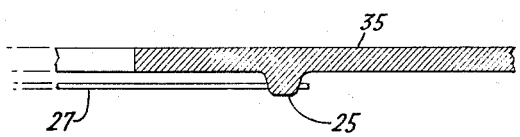
Figure 10:
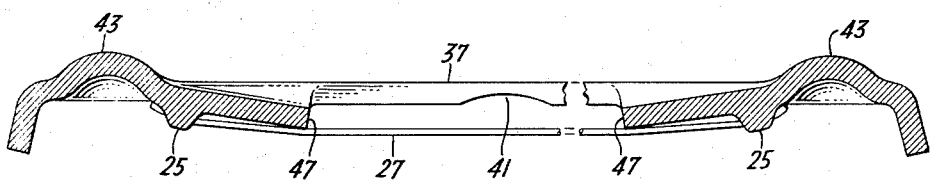
Figure 12:
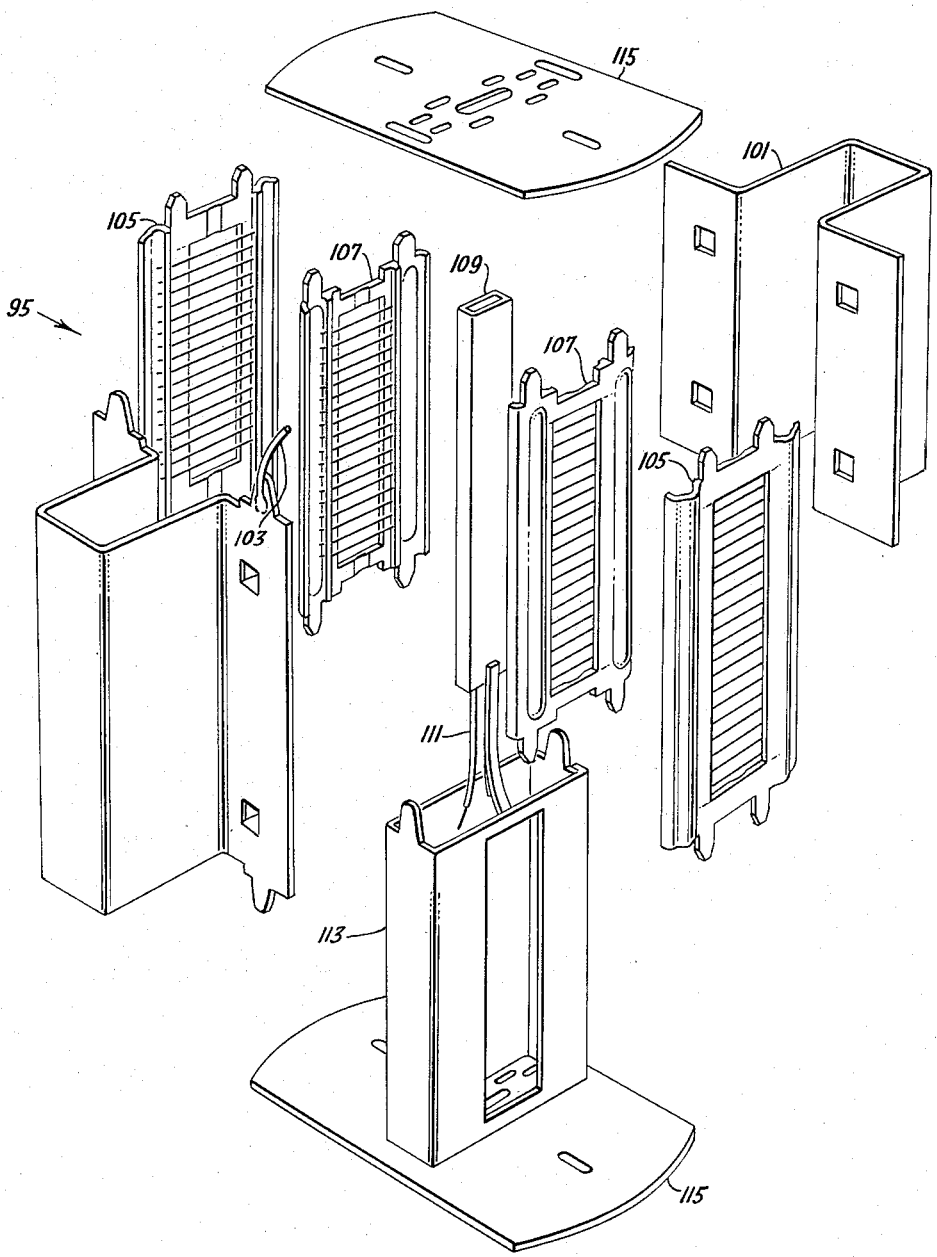
Figure 13:
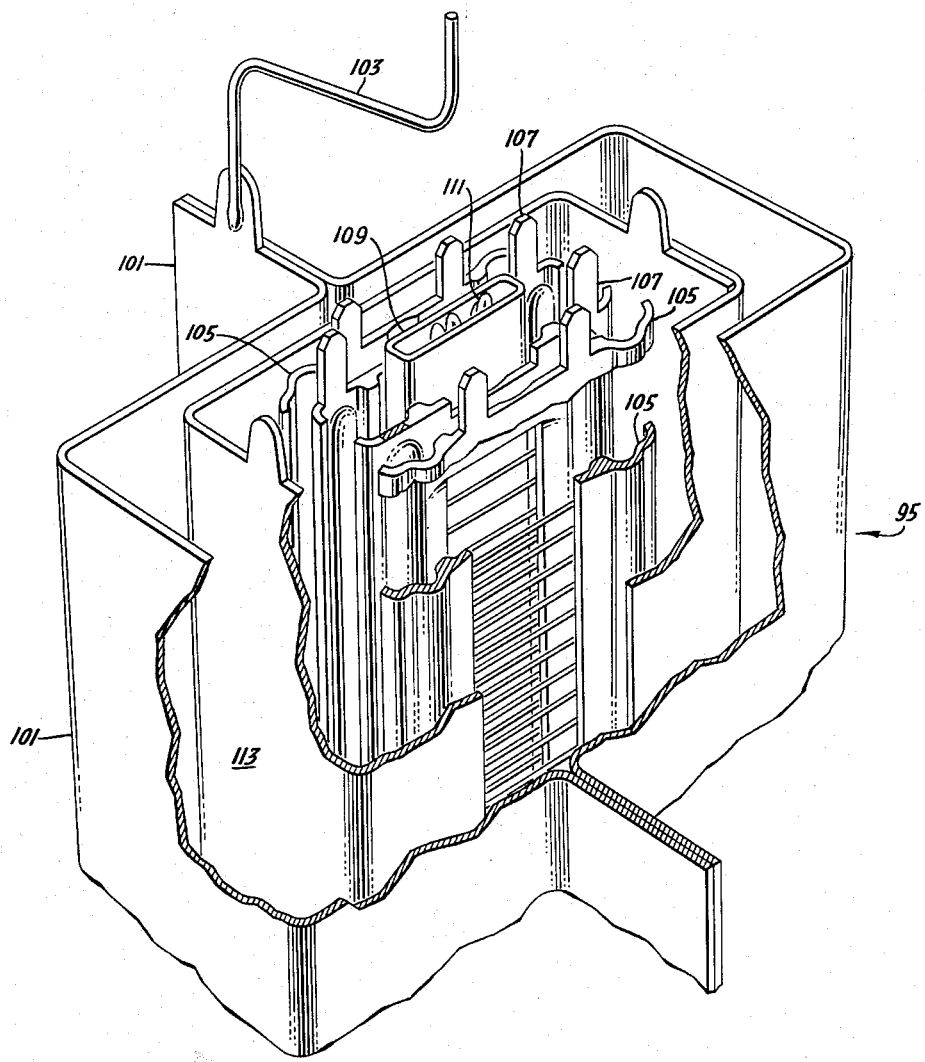

Fig. 2 shows an enlarged side view of the notched and peened grid wire supporting bead; and Fig. 3 shows a number two grid after forming; and Fig. 4 shows a cross section of the grid of Fig. 3; and Fig. 5 shows a punch and die for forming grids; and Fig. 6 shows the face of a punch insert; and Fig. 7 shows the punch and die set of Fig. 5 in closed position; and Fig. 8 shows a number one grid electrode; and Fig. 9 shows a cross section of the grid before forming; and Fig. 10 shows a cross section of the number one grid of Fig. 8; and Fig. 11 shows one view of an assembled tube mount using the grids of Fig. 3 and Fig. 8; and Fig. 12 shows a blow-up of the tube mount of Fig. 11; and Fig. 13 shows a cut away view of the tube mount of Fig. 11.

Referring to Fig. 1, there is shown a grid frame blank 21 having mounting tabs 23 and coined ridges or beads 25. Lateral grid wires 27 may be attached at their terminal ends to raised bead 25 in any manner such as welding or brazing; however, in the preferred embodiment disclosed, lateral grid wires 27 are attached to beads 25 by a notching and peening process, the result of which is best seen in Fig. 2.

Fig. 2 shows an enlarged sectional side view of frame blank 21 and raised bead 25. A notch somewhat similar to the notches 29 is formed in the bead 25 for supporting the terminal end of a given lateral grid wire 27. Then, after the lateral grid wire has been inserted, the notch is peened or closed by a peening tool which deforms the bead somewhat as shown at 31. If desired the lateral grid wires may be attached to the upper surface of the beads by welding, brazing or any other means for making a relatively integral connection between the grid wires and the bead material. Also it may prove desirable in some grid structures to form notches 29 and attach the lateral grid wires by brazing, welding, or by means other than peening.

Referring again to the frame blank of Fig. 1, the grid blank 21 may be formed from any type of sheet metal material selected from a range of materials having suitable strength, thermal and electrical characteristics. To arrive at a frame blank 21 such as shown in Fig. 1 the selected sheet metal material which for example only may comprise nickel clad steel, is preferably first fed through a coining or forming process to provide ridges or beads 25 and then stamped or cut to provide a central aperture 33 along with mounting tabs 23. The resulting structure can be considered as having two side leg portions 35 and two end leg portions 37. After the blanks have been coined and then stamped or cut it may be desirable to soften or heat treat the material before insertion of the grid wires and final forming.

Fig. 3 shows a completed grid formed from a grid blank of Fig. 1 by a process to be hereinafter described in detail. As can be seen, the structure of Fig. 3 differs from the structure of Fig. 1 in that the end legs 37 include end indentations or dimples 41 and the side legs include a channel 43 and side wings 45. As best seen in the cross section Fig. 4, the forming process tends to rotate the side legs so as to bring the internal or side aperture edges 47 into contact with the lateral grid wires 27.

Before considering the important advantages which arise out of the general frame shape ultilized, reference is made to Figs. 5 through 7 which show the punch and die unit used to form a grid blank into the final shape desired. Referring to the particular structure shown in Fig. 5 it will be seen that the top die 48 set includes in a cylindrical shaft 49 which is integrally attached to the punch insert and stripper portion 51. Top punch 53 acts as a spring loaded device by virtue of the force applied by upper spring 54 between the shoulder 55, which is attached to shaft 49, and the upper surface of top punch 53. The bottom die set, generally shown at 57, comprises a die body 59 and a bottom pressure pad 61 which is spring loaded relative to the die body 59 by a spring 62 surrounding lower shaft 63. The lower shaft 63 may be considered to be integrally attached to the bottom pressure pad 61 so as to extend through an aperture, not shown, in the lower die body. If desired shaft 63 could be integrally attached to the lower die body and mounted for sliding movement in an aperture, not shown, in pressure pad 61 so as to allow sliding movement of pressure pad 61 relative to shaft 63, against the force of lower spring 62. Of course the end of shaft 63 cannot be allowed to penetrate through the upper surface of pressure pad 61.

The bottom surface or the face of punch insert 51 can best be seen in Fig. 6. The larger portion of the face comprises a substantially flat land 65 provided with two parallel integral elongated embossments 67 of relatively convex contour positioned to strike the side legs of the frame blank. There are also two spaced dimpling embossments 69, also of convex contour, positioned between the side embossments 67 to strike the end legs of the frame blank.

Bottom pressure pad 61 comprises a flat land portion 71 and two elongated grooves 73 which are intended to receive the frame material punched by punch insert embossments 67.

To start the forming process, a grid blank, as shown in Fig. 1, including attached lateral grid wires, is placed on bottom pressure pad 61 with the lateral grid wire side of the blank in the upward position. The top die set 48 is moved toward the bottom die set 57 by applying a force through shaft 49 from either conventional hydraulic or mechanical means or, if desired, through the use of a conventional air cylinder drive, not shown. The top die set 48 descends until edges 75 of the top punch 53 contact the frame blank and press it firmly against the pressure pad or lower die insert 61. Since the edges 75 of the top punch 53 are slightly angled the lower sharp portions tend to hold the frame blank firmly and limit or block flow of material from external the edges 75 during subsequent portions of the forming process. The internal wing forming indentations 77 in the lower die body 59 form the wings 45, as shown in Figs. 3 and 4, as the bottom pressure pad or lower die set 61 is moved downwardly by the force applied by top die set 48 against the compressive force of lower spring 62. When the bottom pressure pad 61 bottoms, i.e., is stopped in the position shown in Fig. 7, by either a stop attached to lower shaft 63, not shown, or any other type of stopping means, top punch 53 also stops; however, the upper punch insert 51 continues to travel downwardly compressing upper spring 54. As the elongated embossments 67 on the face of punch insert 51 strike the frame grid blank 21, channels start to form in the side legs of the frame blank and internal portions of the side legs are drawn into grooves 73 in pressure pad 61. Since a large portion of the material taken to form the channels is taken from the side leg portions internal the channels, the spacing between the parallel beads 25 on the frame blank tends to increase and stretch the lateral grid wires 27 attached thereto. Before the upper punch insert 51 completes its downward stroke the upper surfaces of both end legs 37 of the blank 21 are struck by the punch insert dimpling embossment 69. Since the bottom pressure pad 61 is generally flat beneath the area to be struck by dimpling embossment 69, the resulting dimple tends to reduce the thickness of the end legs 37 or weaken them so that the final formation of the frame grid side channels 43 tends to stretch all of the lateral grid wires in a relatively uniform manner. Punch insert 51 then is retracted relative to top punch 53 which is held in position by action of spring 54. As shaft 49 is further retracted the punch insert 51 picks up the top punch 53 and the complete top die set 48 is retracted back to its starting position in the forming cycle. Any formed frame which tends to stick to the punch insert 51 is automatically stripped therefrom through relative movement between punch insert 51 and top punch 53 while shaft 49 is being retracted. After the forming step it has been found desirable, in some embodiments, to fire the complete grid primarily for cleaning purposes.

Before considering various spacings between grid structures which may be fabricated using the inventive concepts disclosed and claimed herein, particular note is made to the final clearance between punch insert 51 and the bottom pressure pad 61 with regard to land surfaces 65 and 71. By allowing sufficient clearance between lands 65 and 71, the final forming pressure of the punch and die set as shown in Figs. 5 through 7 tends to rotate the side legs 35 of the frame grid electrode blank so as to bring the internal aperture edges 47 into contact with lateral grid wires 27. This final forming action tends to establish a planar relatively flat grid aperture area by stretching lateral grid wires 27 across the raised plane established by the internal aperture edges 47. It is to be particularly noted that the lateral grid wires are supported by the beads 25 above the upper surface of the side legs adjacent the side legs and due to the final rotation or bending of the side legs contact is made between the lateral grid wires 27 and internal aperture edges 47. As will hereinafter be brought out, not only does this contact between the lateral grid wires 27 and the aperture edges 47 establish a planar grid aperture but it also provides contact with the frame portion through which heat may be dissipated from lateral grid wires 27 directly to the frame as well as through beads 25. Other means of rotating or bending the side legs 35 of the frame blank will occur to those skilled in the art. For example, additional embossments could be included on the land 71 of bottom pressure pad 61.

It is to be understood that the drive mechanism for the punch and die set shown in Figs. 5 through 7 may be any conventional structure well known to those skilled in the art and thus need not be shown or described in detail herein. It should be further understood that the relative spacings between the various embossments and grooves in the complete punch and die set are merely representative, and the location of the grid electrode in the final mount assembly may dictate spacings other than shown. For example, in Figs. 8 and 10 there is shown a typical number one grid which is positioned in a final tube assembly adjacent the cathode. The grid shown in Fig. 3 may be considered to be the number two grid which is finally spaced adjacent the anode in a given tube mount. By comparing the shapes of these two grids it can be seen that tabs 23 in the grid of Fig. 3 are spaced differently than the tabs 23 of the grid shown in Fig. 8, though the general configuration remains similar. Referring to Fig. 8 it may also be seen that the channels 43 are substantially in line with the tabs 23 while in the grid structure of Fig. 3 the channels 43 are completely external tabs 23.

Clearance problems in the final assembly may dictate the shape of various cut-out portions in either the end legs or side legs of any given grid. Thus in the grid shown in Fig. 8 a cathode clearance cut-out 83 has been provided in end legs 37.

In Fig. 9 there is shown a cross section of a typical number one grid blank before forming which can be compared with the cross sectional view of Fig. 10 after forming. As can be seen, not only does the forming process provide strengthening side channels 43 by flowing metal from the side leg portions internal channels 43, but also the final forming process tends to rotate the side legs so as to bring internal aperture edges 47 into contact with the lateral grid wires 27 to form somewhat of a bridging structure. Thus in the number one grid as well as the number two grid the lateral grid wires are attached between raised beads above the upper surface of the frame side legs adjacent the beads 25 and yet in contact with the side legs at internal aperture edges 47.

Referring to Figs. 11 through 13 there is shown a typical stem and electrode mount using the number two grid of Fig. 3 and the number one grid of Fig. 8. The completed mount may comprise an exhaust stem 91 with integrally related terminal pins 93 attached to the various heater and electrode portions of the electrode mount shown generally at 95.

Referring specifically to the electrode mount shown in Figs. 12 and 13 it can be seen that the anode 101 is in two substantially similar parts and formed to enclose the remainder of the electrodes on all sides other than the top and bottom. Lead 103 which is connected to a tab on anode 101 acts as the anode lead extending outside of the tube envelope through the top portion. Frame grid 105 acts as a number two grid being positioned adjacent anode 101. Grid 107 acts as the number one grid being spaced between grids 105 and cathode 109. Heater wires 111 are provided internal the cathode sleeve. Apertured shield element 113 surrounds the grid and cathode portions acting as a beam forming electrode. As can be clearly seen in Fig. 12 upper and lower mica elements 115 are perforated to receive the supporting tabs of the various electrodes.

As can be seen in Fig. 11 and Fig. 13 the grid wires of the number two grid are accurately spaced in the electron stream flow from cathode to anode so as to be immediately behind corresponding lateral grid wires in the number one grid. Due to the original strength of the supporting frame 21 and its excellent heat dissipation characteristics, it is not only possible to make certain that the grid wires of one grid are originally positioned immediately behind the associated grid wires of the next grid but also, due to the improvements in grid structures taught herein, this relationship remains substantially true during subsequent processing and use. With regard to grids of the side rod supported type it has been found that grids made according to the teaching set forth herein are far more stable both mechanically and electrically. There is less variation of electrical characteristics from tube to tube on the production line. There is less change in the electrical characteristics during the useful life of the tube. In part, because of the accurate spacing of the lateral grid wires there is better control of cut-off. Further the plate to screen grid current ratio is generally improved.

It is believed that these improvements stem in part from the fact that heat is more rapidly dissipated in the relatively larger frame than is possible in conventional side rods. With regard to frame grids of the prior art it is believed that the improvements noted herein stem in a large part from the fact that formation of the grid so as to bring the frame aperture edge into contact with the lateral grid wires not only allows control over the original grid tension but also allows direct contact for heat flow between lateral grid wires and the side frame legs so as to maintain desired tension. In addition, by controlling the amount of rotation of the frame side legs in the forming process accurate control is maintained over the grid minor axis measurement, i.e., the distance between similarly positioned lateral grid wires in the two halves of either the number one grid or the number two grid.

Grid structures of the type disclosed herein and made in accordance to the process taught herein have been made from nickel clad sheet metal, and nickel wire has been used for the lateral grid wires. If desired the units may be gold plated or blackened in part where desirable to improve electrical characteristics. Other material may be used, and the choice will depend upon ease of forming and the electrical characteristics desired.

While there has been shown and described what is at present considered the preferred embodiment of the present invention, in view of this disclosure it will become obvious to those skilled in the art that various changes and modifications may be made without departing from the invention as defined in the appended claims.

Having thus described our invention, we claim:

1. In a frame grid structure the combination comprising a sheet metal frame formed to provide a central substantially rectangular aperture defined by the internal edges of a pair of spaced end legs and the raised internal edges of a pair of spaced side legs, a longitudinally extending raised bead on the upper surface of each side leg in spaced relationship with the internal aperture edge, and a plurality of substantially parallel lateral grid wires mounted to extend between and secured within lateral bead grooves above the upper surface of said side legs adjacent said beads and in contact with said side legs adjacent the aperture edge.

2. In a frame grid structure the combination comprising a sheet metal frame formed to provide a central substantially rectangular aperture defined by the internal edges of a pair of spaced end legs and the raised internal edges of a pair of spaced side legs, a longitudinally extending raised bead on the upper surface of each side leg in spaced relationship with the internal aperture edge and a longitudinally extending channel spaced external the bead, and a plurality of substantially parallel lateral grid wires mounted to extend between and secured within substantially closed lateral bead grooves above the upper surface of said side legs adjacent said beads and in contact with said side legs adjacent the aperture edge.

3. In a frame grid structure the combination comprising a sheet metal frame formed to provide a central aperture defined by the internal edges of a pair of spaced end legs and the raised internal edges of a pair of substantially parallel spaced side legs, a longitudinally extending raised bead on the upper surface of each side leg in spaced relationship with the internal aperture edge, and a plurality of lateral grid wires mounted to extend between and secured within substantially lateral bead grooves above the upper surface of said side legs adjacent said beads and in contact with said side legs adjacent the aperture edge.

References Cited in the file of this patent
UNITED STATES PATENTS

| | | |
|---|---|---|
| 2,624,100 | Foulkes | Jan. 6, 1953 |
| 2,829,298 | Gude | Apr. 1, 1958 |